(12) United States Patent
Hasegawa et al.

(10) Patent No.: US 10,879,016 B2
(45) Date of Patent: Dec. 29, 2020

(54) ELECTROCHEMICAL DEVICE AND METHOD FOR MANUFACTURING SAME

(71) Applicant: TDK CORPORATION, Tokyo (JP)

(72) Inventors: Hiroaki Hasegawa, Tokyo (JP); Yuji Yoshino, Tokyo (JP); Kazunori Yoshikawa, Tokyo (JP); Hidetake Itoh, Tokyo (JP); Kazuhiro Anai, Tokyo (JP); Yoshihiko Ohashi, Tokyo (JP)

(73) Assignee: TDK CORPORATION, Tokyo (JP)

( * ) Notice: Subject to any disclaimer, the term of this patent is extended or adjusted under 35 U.S.C. 154(b) by 43 days.

(21) Appl. No.: 16/065,831

(22) PCT Filed: Dec. 26, 2016

(86) PCT No.: PCT/JP2016/088743
§ 371 (c)(1),
(2) Date: Jun. 25, 2018

(87) PCT Pub. No.: WO2017/111168
PCT Pub. Date: Jun. 29, 2017

(65) Prior Publication Data
US 2019/0013157 A1  Jan. 10, 2019

(30) Foreign Application Priority Data
Dec. 25, 2015 (JP) ................................. 2015-254081

(51) Int. Cl.
*H01G 11/52* (2013.01)
*H01G 11/78* (2013.01)
(Continued)

(52) U.S. Cl.
CPC ............ *H01G 11/52* (2013.01); *H01G 11/78* (2013.01); *H01G 11/84* (2013.01); *H01M 2/026* (2013.01);
(Continued)

(58) Field of Classification Search
CPC ........ H01G 11/52; H01G 11/78; H01G 11/84; H01M 2/026; H01M 2/0277;
(Continued)

(56) References Cited

U.S. PATENT DOCUMENTS

2006/0115723 A1* 6/2006 Ando ...................... H01M 2/22
429/162
2013/0308249 A1* 11/2013 Tamachi ................ H01G 9/145
361/504

FOREIGN PATENT DOCUMENTS

| JP | 2005-071658 A | 3/2005 |
| JP | 2006-049670 A | 2/2006 |
| JP | 2010-277925 A | 12/2010 |

OTHER PUBLICATIONS

Mar. 21, 2017 International Search Report issued in Patent Application No. PCT/JP2016/088743.
(Continued)

*Primary Examiner* — Michael P McFadden
(74) *Attorney, Agent, or Firm* — Oliff PLC

(57) ABSTRACT

An electrochemical device which includes: an element main body wherein a pair of internal electrodes are laminated so as to sandwich a separator sheet there between; an outer casing sheet that covers the element main body; sealing parts that hermetically seal the peripheral part of the outer casing sheet so that the element main body is immersed in an electrolyte solution; and lead terminals that are electrically connected to the internal electrodes respectively and are led out from the sealing parts of the outer casing sheet to the outside. A resin inner layer that is present in the inner surface of the outer casing sheet is provided with a fusion bonding part for separators, which partially bonds a part of the separator sheet to the inner surface of the outer casing sheet.

5 Claims, 15 Drawing Sheets

(51) Int. Cl.
| | |
|---|---|
| *H01G 11/84* | (2013.01) |
| *H01M 2/06* | (2006.01) |
| *H01M 2/02* | (2006.01) |
| *H01M 10/04* | (2006.01) |
| *H01M 2/18* | (2006.01) |
| *H01M 2/30* | (2006.01) |
| *H01M 10/0585* | (2010.01) |

(52) U.S. Cl.
CPC ....... *H01M 2/0277* (2013.01); *H01M 2/0285* (2013.01); *H01M 2/0287* (2013.01); *H01M 2/06* (2013.01); *H01M 2/18* (2013.01); *H01M 2/30* (2013.01); *H01M 10/0436* (2013.01); *H01M 10/0463* (2013.01); *H01M 10/0585* (2013.01); *H01M 2220/20* (2013.01); *Y02E 60/13* (2013.01)

(58) Field of Classification Search
CPC .... H01M 2/0285; H01M 2/0287; H01M 2/06; H01M 2/18; H01M 2/30; H01M 10/0436; H01M 10/0463; H01M 10/0585; H01M 2220/20; Y02E 60/13
USPC ........................................................ 361/502
See application file for complete search history.

(56) References Cited

OTHER PUBLICATIONS

Jun. 26, 2018 International Preliminary Report on Patentability issued in International Patent Application No. PCT/JP2016/088743.

\* cited by examiner

ELECTROCHEMICAL DEVICE AND METHOD FOR MANUFACTURING SAME

TECHNICAL FIELD

The present invention relates to an electrochemical device preferably used as an electric double layer capacitor (EDLC) or so, and also relates to a method of production of the electrochemical device.

BACKGROUND ART

Recently, IC card mounted with IC chip is widely used. Particularly, there are IC cards capable of money exchange, and these are used for various purposes such as company ID cards and membership cards or so. Thus, IC card with higher functionality is in demand.

Along with attaining the higher functionality of IC card, as a secondary battery used in a conventional IC card, a use of a primary battery having capacity as high as possible has been considered. However, in case of the primary battery, if a storage capacity is used up, then the card must be changed. Hence, IC card using a chargeable secondary battery is in development.

As characteristics of the secondary battery for IC card, a thin IC card having thickness of a card or thinner, a compact IC card capable of incorporated in a card, and a flexibility which can be bend are demanded. On the other hand, a system is also under development which does not require a charging system in IC card, and communicates using a power obtained through a card reader without making a contact.

However, a power obtained from a non-contact charging is small, thus a sufficient power cannot be obtained for a product with high functionality. Therefore, there is a need of the secondary battery with small charging loss, capable of charging in short period of time, and capable of charging up to a driving voltage of a circuit.

As for the conventional electrochemical device, because an electric storage capacity is large, a sufficient voltage cannot be sent to the card reader. Therefore, there is a need of EDLC having a low capacity and adequate resistance. Here, the thickness of the battery product in IC card is for example 1.0 mm or less, preferably 0.9 mm or less, and more preferably 0.5 mm or less, which means it is demanded to be very thin. Also, an area for incorporating EDLC in the card is limited as well.

For example, a conventional EDLC disclosed in the patent document 1 or so has a stacking structure wherein a separator is placed between a pair of internal electrodes on an inner side of an exterior sheet, but the internal electrodes need to be positioned so that these are facing against each other while placing the separator in between. Thus, conventionally, the pair of internal electrodes and the separator are positioned by adhering to each other using insulation tape or so. After a positioning is done, the insulation tape for the positioning will be left on the inner side of the exterior sheet because the inner side of the exterior sheet is sealed. Thus, conventionally, it was thicker due to the thickness of the insulation tape for the positioning, hence it was difficult to thin EDLC to the level it was demanded.

PRIOR ART

[Patent document 1] JP Patent Application Laid Open No. 2006-49670

SUMMARY OF INVENTION

Problem to be Solved by the Invention

The present invention was carried out in view of such circumstances, and the object thereof is to provide the electrochemical device which can be thinned to the level capable of incorporated into a thin electronic device such as IC card or so, and also relates to a method of producing the electrochemical device.

Means for Solving the Problem

In order to attain the above mentioned object, the electrochemical device according to the present invention comprises an element main body formed by stacking a pair of internal electrodes and a separator sheet placed between the pair of internal electrodes, an exterior sheet covering the element main body, a sealing part to seal an outer edge of the exterior sheet for immersing the element main body in an electrolyte, a lead terminal electrically connected to either of the internal electrodes and extending to an outer side from the sealing part of the exterior sheet, wherein a separator bonding part for fixing at least part of the separator sheet to an inner surface of the exterior sheet is formed on an inner layer made of a resin present on the inner surface of the exterior sheet.

In the present invention, the separator bonding part for fixing the part of the separator sheet to the inner surface of the exterior sheet is formed on the inner layer made of resin present on the inner surface of the exterior sheet. Thus, at least the separator is positioned on an inner side of the exterior sheet, and the position with respect to the internal electrodes can be determined easily, thus the positioning tape is unnecessary.

That is, the electrochemical device according to the present invention can make the thickness of the device to 1 mm or less, preferably 0.9 mm or less, more preferably 0.5 mm or less while preventing a shifting of the position between the separator and the pair of the internal electrodes on the inner side of the exterior sheet. As a result, the electrochemical device can be thinned to the level that it can be incorporated in the thin electronic device such as IC card or so.

Preferably, the separator bonding part adheres to part of the separator sheet which does not overlap with the internal electrodes. By having such constitution, the function of the active material layer formed on the internal electrodes can be exhibited sufficiently.

Preferably, an electrode bonding part for fixing a part of the internal electrodes not overlapping with the separator sheet to the inner surface of the exterior sheet is formed on the inner layer separately from the separator bonding part. By taking such constitution, the internal electrodes are also fixed to the inner surface and positioned. Therefore, the pair of the internal electrodes can be easily positioned against the separator sheet, hence there is no needs of the positioning tape, and contributes to make the device thinner.

Also, the electrode bonding part is formed on a part of the inner surface which does not overlap with the separator sheet; hence the function of the active material layer formed on the internal electrodes at the position overlapping with the separator sheet can be sufficiently exhibited.

Preferably, the exterior sheet has a front face part covering a front face of the element main body, and a back face part covering a back face of the element main body, and the pair of the internal electrodes are fixed to either one of the front face part or the back face part on the electrode bonding part.

By taking such constitution, the pair of the internal electrodes and the separator sheet can be positioned against the front face part or the back face part of the exterior sheet, and the position shifting of the internal electrodes does not occur, and the performance of the device will improve. Also, there is no needs of the positioning tape, and contributes to make the device thinner.

Alternatively, the exterior sheet has a front face part covering a front face of the element main body, and a back face part covering a back face of the element main body, and either one of the pair of the internal electrodes is fixed to either one of the front face part or the back face part on the electrode bonding part, and another one of the pair of the internal electrodes is fixed to another one of the front face part or the back face part on the electrode bonding part.

By taking such constitution, the pair of the internal electrodes and the separator sheet can be positioned against the front face part and the back face part of the exterior sheet, and the position shifting of the internal electrodes does not occur, and the performance of the device will improve. Also, there is no needs of the positioning tape, and contributes to make the device thinner.

Preferably, one face of the lead terminal extending to the outside from the sealing part of the exterior sheet directly contacts with the inner layer made of resin formed on the inner surface of the exterior sheet positioned at the sealing part.

Conventionally, it was thought that an adhesive resin attached to both faces of the lead terminal was necessary for avoiding a short circuit and also securing a sealing, wherein the adhesive resin corresponds to the insulation tape which is for constituting the sealing part attached to the both faces of the lead terminal. However, as a result of keen examination by the present inventors, it was found that securing the sealing property and avoiding the short circuit can be both attained by attaching the insulation tape, which is for constituting the sealing part, only to one face of the lead terminal to use as the adhesive resin, and bonding another face of the lead terminal directly to the inner layer made of resin formed on the inner surface of the exterior sheet. As a result, while securing the sealing and avoiding the short circuit, the thickness of the sealing part which is the thickest part was thinned as much as possible.

That is, for this electrochemical device, the thickness of the device can be made even thinner while securing the sealing of the inside of the device and avoiding the short circuit.

Preferably, on another face of the lead terminal extending to the outside from the sealing part of the exterior sheet, the outer edge of the exterior sheet is bonded by the adhesive resin which contacts with the inner layer made of resin formed on the inner surface of the exterior sheet, and the part of the adhesive resin protrudes to the outside from the outer edge of the exterior sheet and covers the periphery of the outer edge of the exterior sheet.

As the exterior sheet, a sheet of which both faces of the metal sheet are covered with an insulation layer is preferably used. At the periphery of the outer edge of the exterior sheet, an end part of the metal sheet may be exposed, and if the exposed metal sheet contacts with the lead terminal, this causes the short circuit. In the preferable embodiment of the present invention, a part of the adhesive resin constituting the sealing part protrudes from the outer edge of the exterior sheet, and the periphery of the outer edge of the exterior sheet is covered with the adhesive resin. Therefore, at the periphery of the outer edge of the exterior sheet, the end of the metal sheet constituting the exterior sheet does not expose, hence the short circuit or so between the lead terminal and the meal sheet can be effectively prevented.

The electrochemical device of the present invention may further have a support sheet for preventing the bending of the lead terminal extending from the sealing part. By constituting as such, the bending of the lead terminal extending from the sealing part can be effectively prevented.

Preferably, the support sheet is constituted such that part of the outer edge of the exterior sheet positioned at the sealing part extends to the outside. By taking such constitution, the support sheet can be easily formed.

The length of the protrusion of the support sheet may be longer than the protrusion of the lead terminal. By taking such constitution, the bending of the lead terminal extending from the sealing part can be effectively prevented.

At the plane of the support sheet which contacts with the lead terminal extending from the sealing part, a heat resistance insulation layer may be stacked. By taking such constitution, even if heat is applied when the lead terminal and an external connection terminal are electrically connected, the short circuit between the lead terminal and the metal sheet present at the inside of the exterior sheet can be effectively prevented.

The method of producing the electrochemical device according to any one of the invention mentioned in the above has steps of;

partially bonding either one of the internal electrodes to the inner surface of the exterior sheet, partially bonding the separator sheet to the inner surface of the exterior sheet so that an active material layer of the internal electrodes is covered with the separator sheet, partially bonding either one of the internal electrodes to the inner surface of the exterior sheet so that either one of the internal electrodes is placed on the separator sheet, covering the element main body with the exterior sheet, sealing the outer edge of the exterior sheet for immersing the element main body in the electrolyte.

Preferably, the sealing part from which the lead terminal extends is formed by heat pressing a sealing tape placed between the exterior sheet, and the sealing tape is partially bonded to the inner surface of the exterior sheet together with the internal electrodes prior to the heat pressing.

DESCRIPTION OF EMBODIMENTS

Hereinafter, the present invention will be described in detail based on the embodiments shown in figures.

First Embodiment

Figure 1A:
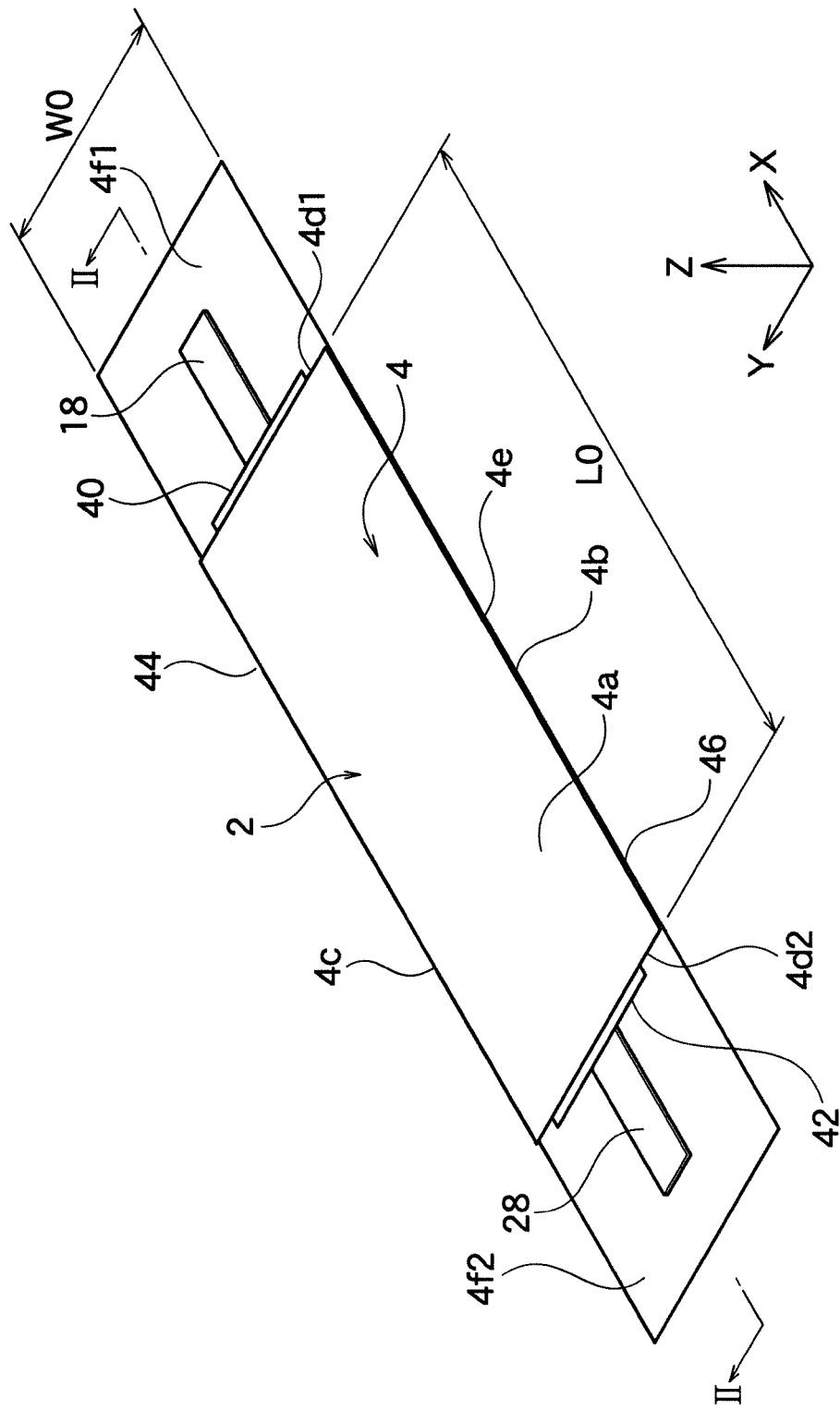
FIG. 1A is a perspective figure of an electric double layer capacitor according to an embodiment of the present invention.

As shown in FIG. 1A, the electric double layer capacitor (EDLC) 2 as the electrochemical device according to an embodiment of the present invention has the exterior sheet 4. The exterior sheet 4 has the surface 4a and the back face 4b which are made by folding one exterior sheet 4 at a folding outer edge part 4c.

In the present embodiment, the exterior sheet 4 has a rectangle shape wherein a length L0 in X axis direction is longer than a length W0 in Y axis direction. However, the shape is not limited thereto, and it may be a square shape, other polygonal shape, a circular shape, an oval shape, and other shapes or so. In this embodiment, a thickness direction (Z axis direction) is the direction which the surface 4a and the back face 4b of the exterior sheet 4 overlap, and X axis and Y axis are the perpendicular direction to this.

As it will be described in below using FIG. 2A, the element main body 10 is incorporated at an inner side of the exterior sheet 4. Pair of lead terminals 18 and 28 extending from the element main body 10 are placed onto the support sheets 4f1 and 4f2 at the outside of the exterior sheet 4.

As shown in FIG. 1A, in the present embodiment, the inner side of the exterior sheet 4 of rectangle shape is sealed by a first sealing part 40, a second sealing part 42, a third sealing part 44, and a fourth sealing part 46 which are formed along four sides of the exterior sheet 4.

In this embodiment, the first sealing part 40 is the part which seals an outer edge 4d1 of the exterior sheet 4 where the lead terminal 18 extends to the outside in X axis direction. Also, the second sealing part 42 is the part which seals an outer edge 4d2 of the exterior sheet 4 where the lead terminal 28 extends to the outside in X axis direction. The first sealing part 40 and the second sealing part 42 are positioned at an oppose side in X axis direction of the exterior sheet 4. Also, the third sealing part 44 is the part which seals an outer edge 4c formed by folding the exterior sheet 4; and the fourth sealing part is the part which seals an outer edge 4e of the exterior sheet 4 positioned at the opposite side of the outer edge 4c in Y axis direction.

Figure 2A:
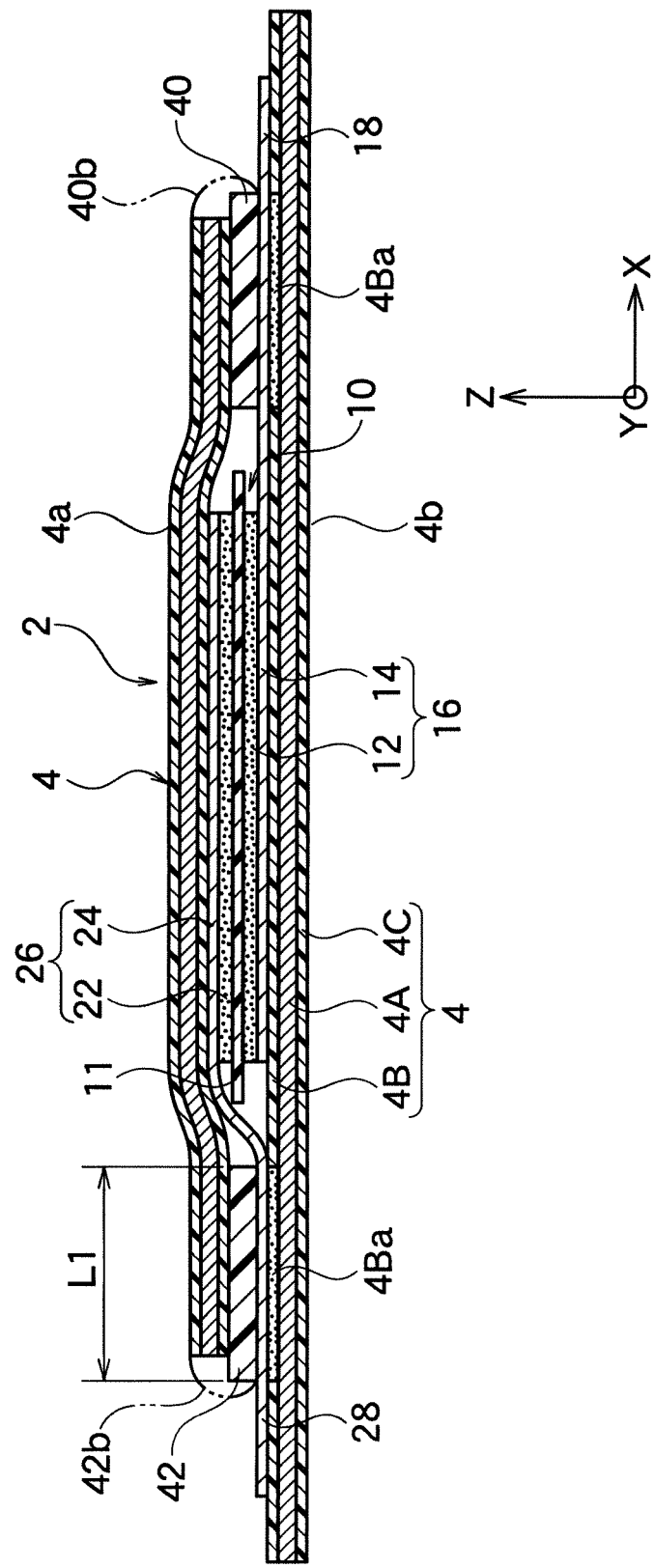
FIG. 2A is a schematic cross section figure along II-II line of FIG. 1A.

As shown in FIG. 2A, on the inner side of the folded exterior sheet 4, the element main body 10 is incorporated. The element main body 10 has a constitution of the electric double layer capacitor, and in the present embodiment, a single capacitor element is placed on the inner side of the folded exterior sheet 4.

In the element main body 10, pair of first internal electrode 16 and second internal electrode 26 are stacked so that a separator sheet 11 infiltrated with the electrolyte is placed in between. Either one of the first internal electrode 16 and the second internal electrode 26 is a positive electrode, and other one is a negative electrode, but the constitution is the same. These first internal electrode 16 and second internal electrode 26 have a first active material layer 12 and a second active material layer 22 which are stacked so that the first active material layer 12 and the second active material layer 22 respectively contact with the separator sheet 11 at the opposite faces. Also, the first internal electrode 16 and the second internal electrode 26 have a first collector layer 14 and a second collector layer 24 which are stacked so that the first collector layer 14 and the second collector layer 24 respectively contact with the first active material layer 12 and the second active material layer 22.

The separator sheet 11 electrically insulates the internal electrodes 16 and 26, and it is constituted so that the electrolyte can be infiltrated, and for example it is constituted by a porous sheet having an electric insulation property. As the porous sheet having the electric insulation property, a single layer or a multilayer film made of polyethylene, polypropylene, or polyolefin; a stretchable film made of mixture of the above mentioned resin or so; or an unwoven felt made of material at least one selected from the group consisting of cellulose, polyester, and polypropylene or so may be mentioned. The thickness of the separator sheet 11 is for example about 5 to 50 µm or so.

The collector layers 14 and 24 are not particularly limited as long as these are the material having high conductivity in general. However, a metal material having a low electric resistance is preferably used, and for example a sheet of copper, aluminum, and nickel or so is used. Thickness of each of the collector layers 14 and 24 are for example about 15 to 100 µm.

The active material layers 12 and 22 include an active material and a binder, and preferably include a conductive auxiliary agent. The active material layers 12 and 22 are formed by stacking on the surface of the sheet constituting the collector layers 14 and 24 respectively corresponding to the active material layers 12 and 22.

As the active material, various porous materials having an electron conductivity may be mentioned, and for example carbon materials such as activated carbon, natural graphite, artificial graphite, mesocarbon microbeads, mesocarbon fiber (MCF), cokes, glass form carbon, and organic compound fired material or so may be mentioned. As the binder, it is not particularly limited as long as the above mentioned active material and preferably the conductive auxiliary agent can be fixed to the sheet constituting the collector layer, and various binders can be used. As the binder, for example fluoride resins such as polyvinylidene fluoride (PVDF) and polytetrafluoroethylene (PTFE) or so, and a mixture between styrene-butadiene rubber (SBR) and aqueous polymer (carboxymethyl cellulose, polyvinyl alcohol, sodium polyacrylate, dextrin, gluten or so) may be mentioned.

The conductive auxiliary agent is a material added to enhance the electron conductivity of the active material layers 12 and 22. As the conductive auxiliary agent, for example carbon materials such as carbon black, acetylene black or so, metal fine metal powders such as copper, nickel, stainless steel, iron or so, a mixture between the carbon material and the metal fine powders, and conductive oxides such as ITO or so may be mentioned.

The thickness of each of the active material layers 12 and 22 are preferably about 1 to 100 μm or so. The active material layers 12 and 22 are formed on each of the first collector layer 14 and second collector layer 24 having an area of same or smaller than the separator layer 11. The active material layers 12 and 22 can be formed by known methods.

In the present embodiment, "the positive electrode" refers to the electrode which attracts anions in the electrolyte when the voltage is applied to the electric double layer capacitor; and "the negative electrode" refers to the electrode which attracts cations in the electrolyte when the voltage is applied to the electric double layer capacitor. Note that, in case of recharging after once charging the electric double layer capacitor by applying the voltage in a specific positive-negative direction, usually the recharging is done in the same direction as the first time, and the voltage in the opposite direction is rarely applied for charging.

The exterior sheet 4 is made of the material which does not allow the electrolyte to pass through. Furthermore, the material of the exterior sheet is preferably those formed into one body by heat sealing the outer edges of the exterior sheet 4 against each other, or with the sealing tape 40a (hereafter, 42a may be included) as shown in FIG. 5. This sealing tape 40a preferably has a tape form such as an adhesive tape or so from the point of workability. Note that, it is not limited to a tape, and it may be any form as long as it can be bonded by melting with heat such as a sealant resin which can be coated.

Also, the exterior sheet 4 seals the element main body 10, and it is constituted by those which can prevent air and water from entering the inner side of the exterior sheet 4. Specifically, the exterior sheet 4 may be a single layer sheet, but as shown in FIG. 2A, it is preferably a multilayered sheet wherein the metal sheet 4A is stacked so that it is placed between the inner layer 4B and the outer layer 4C.

The metal sheet 4A is preferably constituted for example by stainless steel or so. The inner layer 4B is preferably constituted by an electric insulation material and the same material as the separator sheet such as polypropylene which hardly reacts with the electrolyte and capable of heat sealing. Also, the outer layer 4C is not particularly limited, and for example it is constituted by PET, PC, PES, PEN, PI, fluorine resin, PE, polybutyleneterephthalate (PBT) or so. The thickness of the exterior sheet 4 is preferably 5 to 80 μm.

In the present embodiment, a proof stress of the exterior sheet is 390 to 1275 N/mm$^2$, and preferably 785 to 980 N/mm$^2$ according to JIS Z2241. Also, a hardness of the exterior sheet is 230 to 480, and preferably 280 to 380 in terms of Vickers hardness (Hv) (JIS 2244). From such point, the metal sheet 4A of the exterior sheet 4 is preferably a stainless steel SUS304 (BA), SUS304 (1/2H), SUS304 (1/2H), SUS304 H, SUS301 BA, SUS301 (1/2H), and SUS301 (3/4H).

The lead terminals 18 and 28 are the conductive members which function as an input and output terminal of the current to the collector layers 14 and 24, and the lead terminals 18 and 28 have a rectangular plate shape. In the present embodiment, each of the lead terminals 18 and 28 are formed in sheet which are integrated with the conductive sheet respectively constituting the collector layers 14 and 24; and the thickness may be same as the collector layers 14 and 24. Note that, each of the lead terminals 18 and 28 may be formed by a different conductive member than the collector layers 14 and 24, and may be electrically connected with each of the collector layers 14 and 24. In this case, the thickness of the lead terminals 18 and 28 may be different from the collector layers 14 and 24, and for example it may be 20 to 100 μm or so.

At a space formed between the exterior sheet 4 and used for sealing the element main body 10 by the sealing parts 40, 42, 44 and 46, the electrolyte is filled (not shown in the figure), and part of it will be impregnated in the active material layers 12 and 22, and in the separator sheet 11.

As the electrolyte, an organic solvent dissolved with electrolyte salt is used. As the electrolyte salt, for example, quaternary ammonium salt such as tetraethylammoniumtetrafluoroborate (TEA$^+$BF$^{4-}$) and triethylmethylammonium tetrafluoroborate (TEMA$^+$BF$^{4-}$) or so, ammonium salt, amine salt, and amidine salt or so is preferably used. Note that, as these electrolytes, one kind may be used alone, or two or more kinds may be used together.

Also, as the organic solvent, known solvents can be used. As the organic solvents, for example propylene carbonate, ethylene carbonate, dimethyl carbonate, methylethyl carbonate, diethyl carbonate, γ-butyrolactone, dimethylformamide, sulfolane, acetonitrile, propionitrile, methoxyacetonitrile or so may be mentioned. These may be used alone, or by mixing two or more thereof in arbitrary ratio.

As shown in FIG. 2A, a tip of the lead terminals 18 and 28 respectively passes through the first sealing part 40 and the second sealing part 42, and extends to the outside of the first sealing part 40 and the second sealing part 42. The first sealing part 40 and the second sealing part 42 are the parts where each of lead terminals 18 and 28 extends to the outside, and compared to the third sealing part 43 and the fourth sealing part 44, the sealing is particularly needed.

Figure 3:
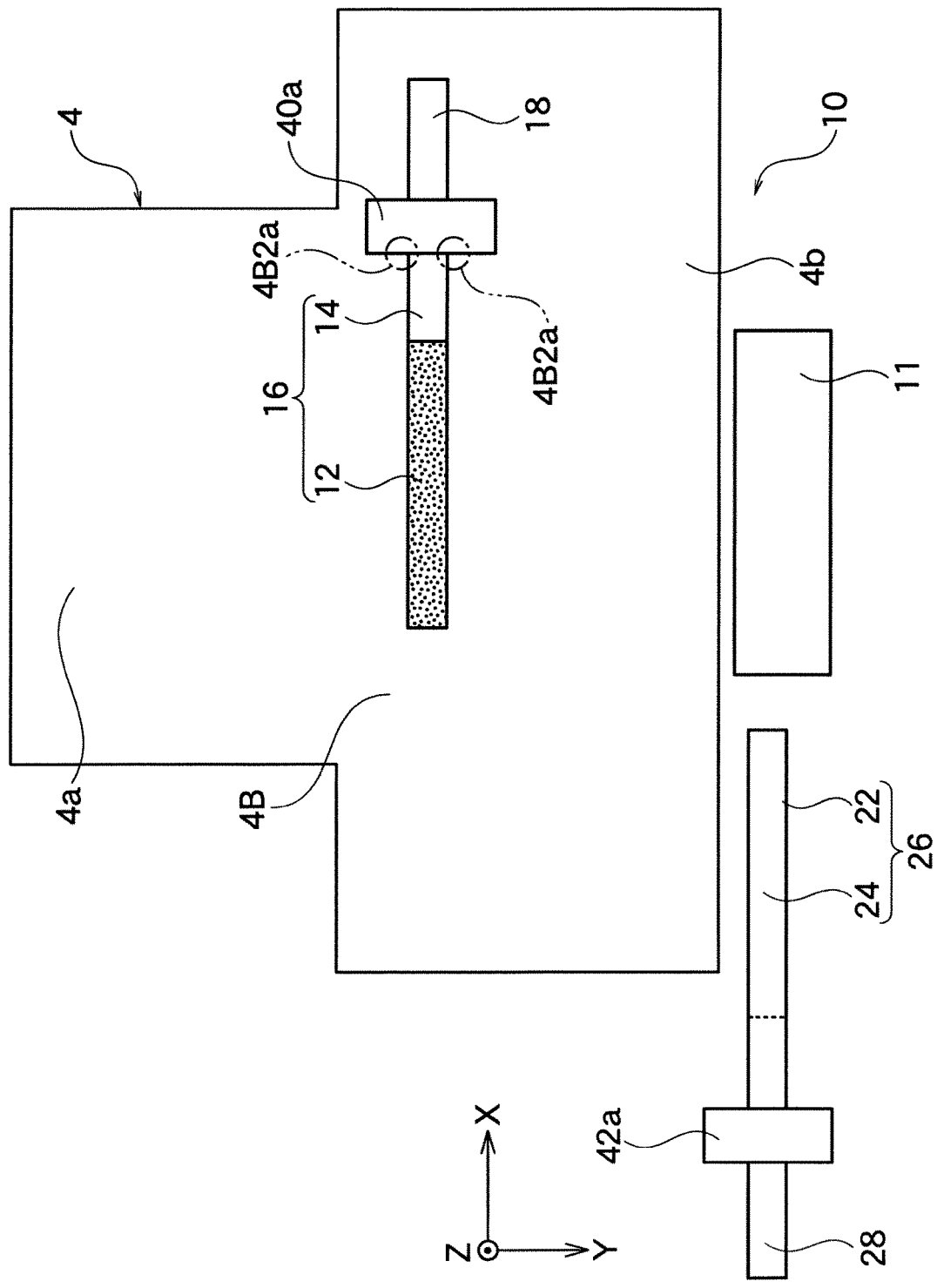
FIG. 3 is a schematic prospective figure showing an example of the method of producing the electric double layer capacitor shown in FIG. 1.

The width in Y axis direction of the lead terminals 18 and 28 shown in FIG. 3 and FIG. 4 may be same or different. Also, in case these lead terminals 18 and 28 are integrally formed with the collector layers 14 and 24 respectively corresponding to the lead terminals 18 and 28, the width in Y axis direction of the lead terminals 18 and 28 may be about the same as the Y axis direction width W1 of the collector layers 14 and 24 (see FIG. 4), but it may be smaller or larger than the width W1.

The Y axis direction width W1 of the collector layers 14 and 24 is preferably 2 to 10 mm, and it is preferably smaller than Y axis direction width W3 of the separator sheet 11. The difference between W3 and W1 is preferably 0.2 to 2 mm. The collector layers 14 and 24 are preferably placed at a center of Y axis direction of the separator sheet 11.

Also, the width W0 in Y axis direction of EDLC2 shown in FIG. 1 is preferably 10 to 50 mm in case it is housed in IC card, and the length L0 in X axis direction of EDLC2 excluding the lead terminals 18 and 28 is preferably 10 to 50 mm.

Figure 5A:
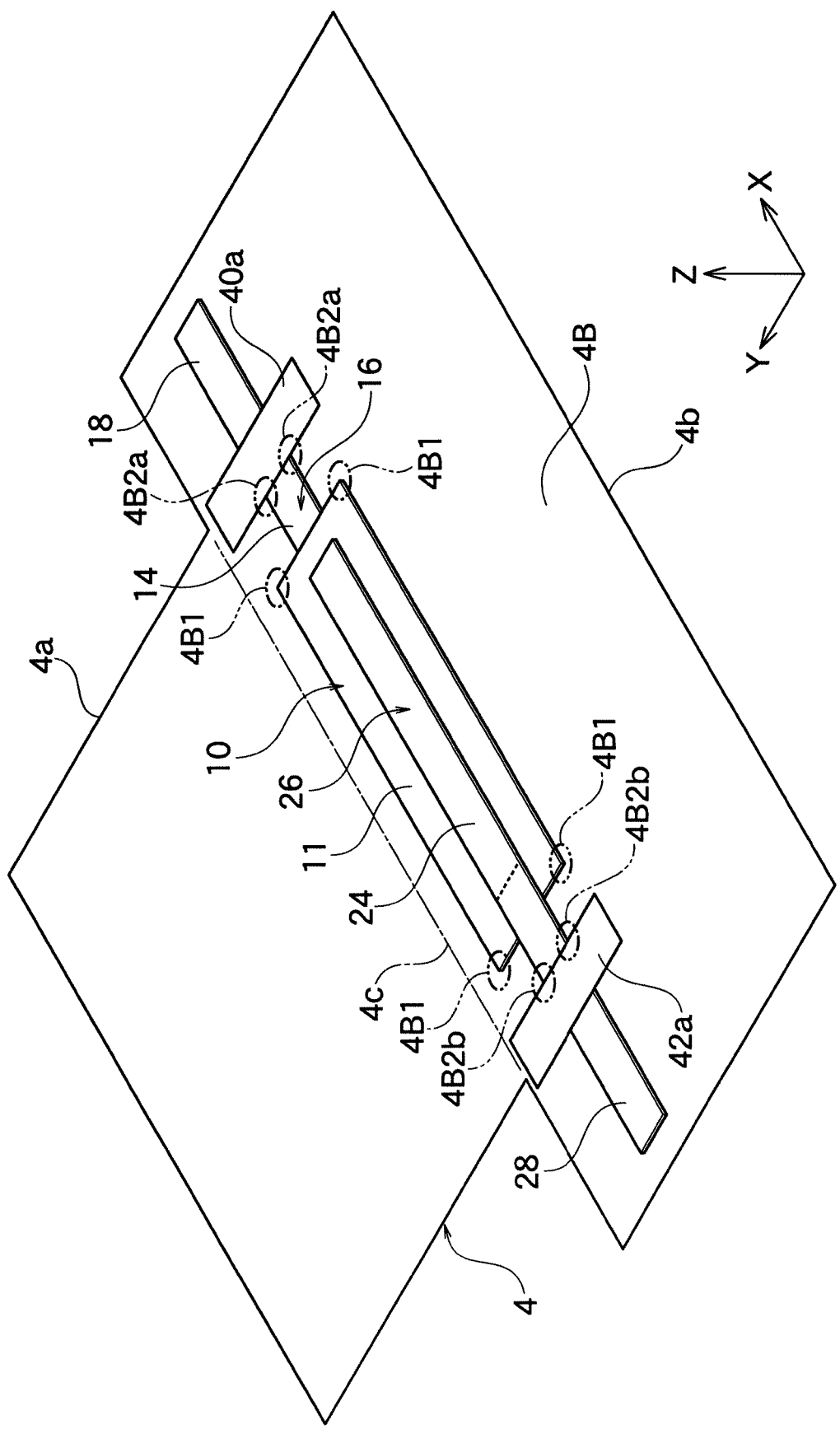
FIG. 5A is a perspective figure showing a step following FIG. 4B.
Figure 5B:
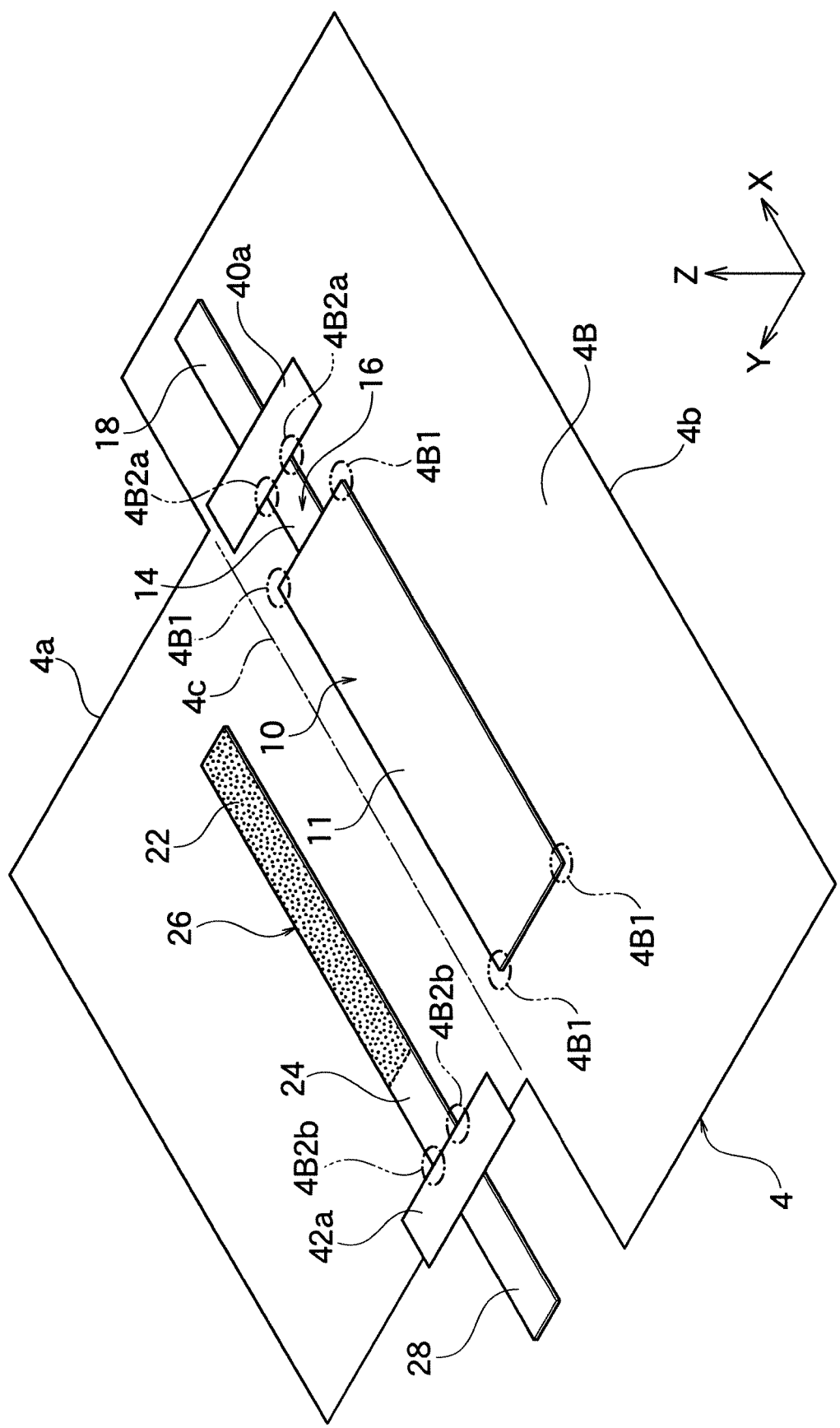
FIG. 5B is a perspective view corresponding to FIG. 5A showing the method of production according to other embodiment of the present invention.
Figure 6:
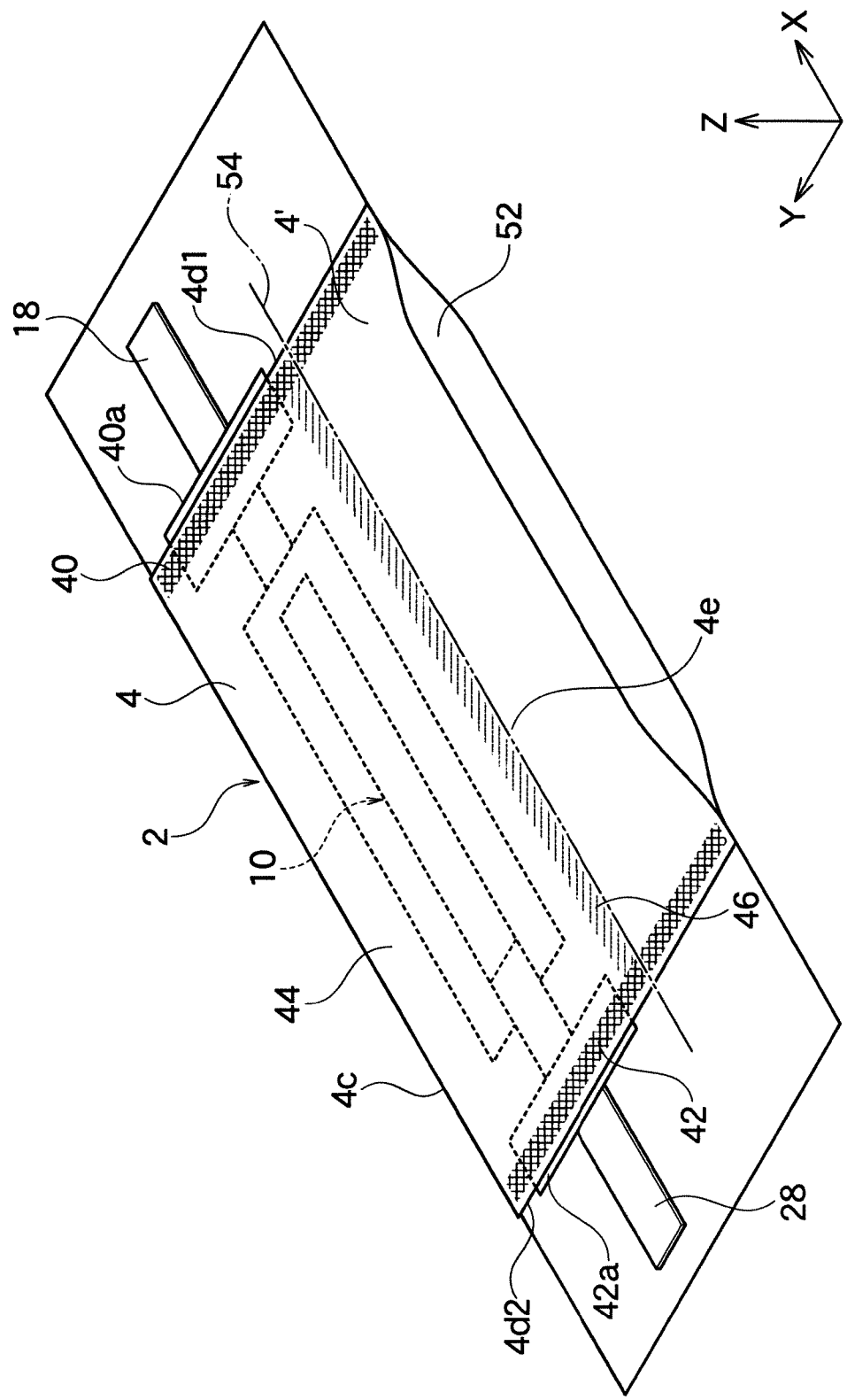
FIG. 6 is a perspective figure showing a step following FIG. 5A or FIG. 5B.

In the present embodiment, as shown in FIG. 5 and FIG. 6, the sealing tapes 40a and 42a and the outer edges 4d1 and 4d2 are integrated by the heat sealing; thereby the first sealing part 40 and the second sealing part 42 are formed. Here, as shown in FIG. 2A, part of the inner layer (resin) 4B formed at the inner surface of the exterior sheet 4 contacts and adheres to one side of the lead terminals 18 and 28, then forms the heat fusion part 4Ba. Thereby, the sealing property of the first sealing part 40 and the second sealing part 42 is improved.

Also, in the third sealing part 44 shown in FIG. 1A, the exterior sheet 4 is folded at the folding outer edge 4c of the exterior sheet 4, and the inner layer 4B of the exterior sheet 4 is integrally bonded by the heat sealing. For the fourth sealing part 46, the inner layer 4B of each outer edge 4e of the surface 4a and the back face 4b of the exterior sheet 4 is integrally bonded due to the heat sealing.

The first sealing part 40 is formed continuously so that each end of the first sealing part 40 in Y axis direction is respectively connected with one end of the third sealing part 44 and one end of the fourth sealing part 46. The second sealing part 42 is formed continuously so that the other end of the third sealing part 44 and the other end of the fourth sealing part 46 are connected. Hence, the inner side of the exterior sheet 4 is tightly sealed from the outside of the exterior sheet 4.

In EDLC2 of the present embodiment, the first lead terminal 18 and the second lead terminal 28 of the element main body 10 extend to the opposite direction along the longitudinal direction (X axis direction) of EDLC2. Therefore, the width in Y axis direction of EDLC2 can be made small, and also the thickness of the first sealing part 40 and the second sealing part 42 can be a bare minimum, and the entire EDLC2 can be made thin as well. Thereby, EDLC2 can be made compact and thin.

In EDLC2 of the present embodiment, for example the first lead terminal 18 is the positive electrode and the second lead terminal 28 is the negative electrode, and connected to the element main body 10 immersed in the electrolyte. EDLC has a maximum withstand voltage of about 2.85 V or so per single element, and in order to improve the withstand voltage depending on the use, the element may be connected in series. EDLC2 of the present embodiment is extremely thin and has a sufficient withstand voltage, thus it can be suitably used in place of the battery incorporated into the thin electronic device such as IC card or so.

Next, an example of the production method of EDLC2 of the present embodiment will be described by referring to FIG. 3 to FIG. 6.

Figure 4A:
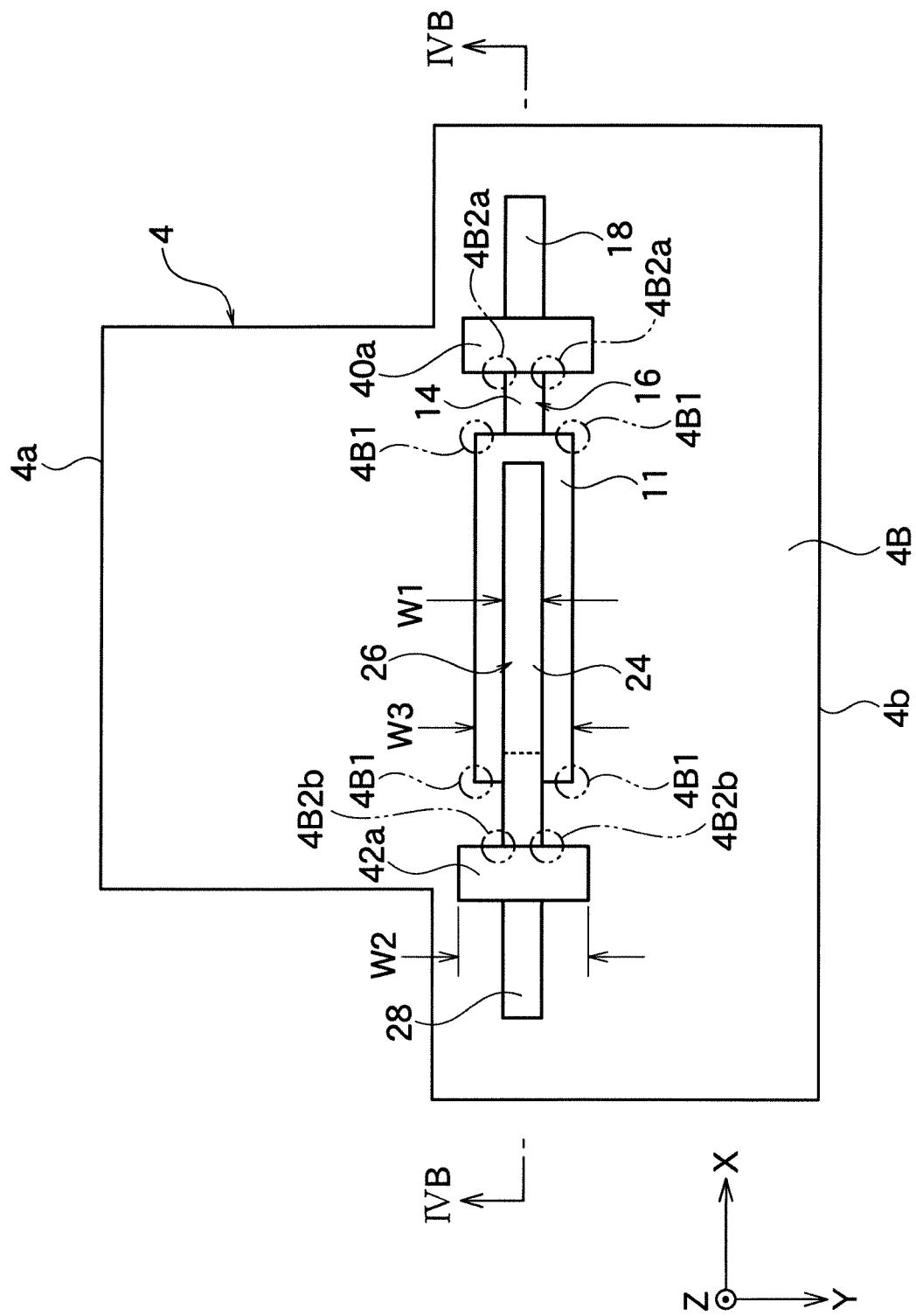
FIG. 4A is a perspective cross section figure showing a step following FIG. 3.
Figure 4B:
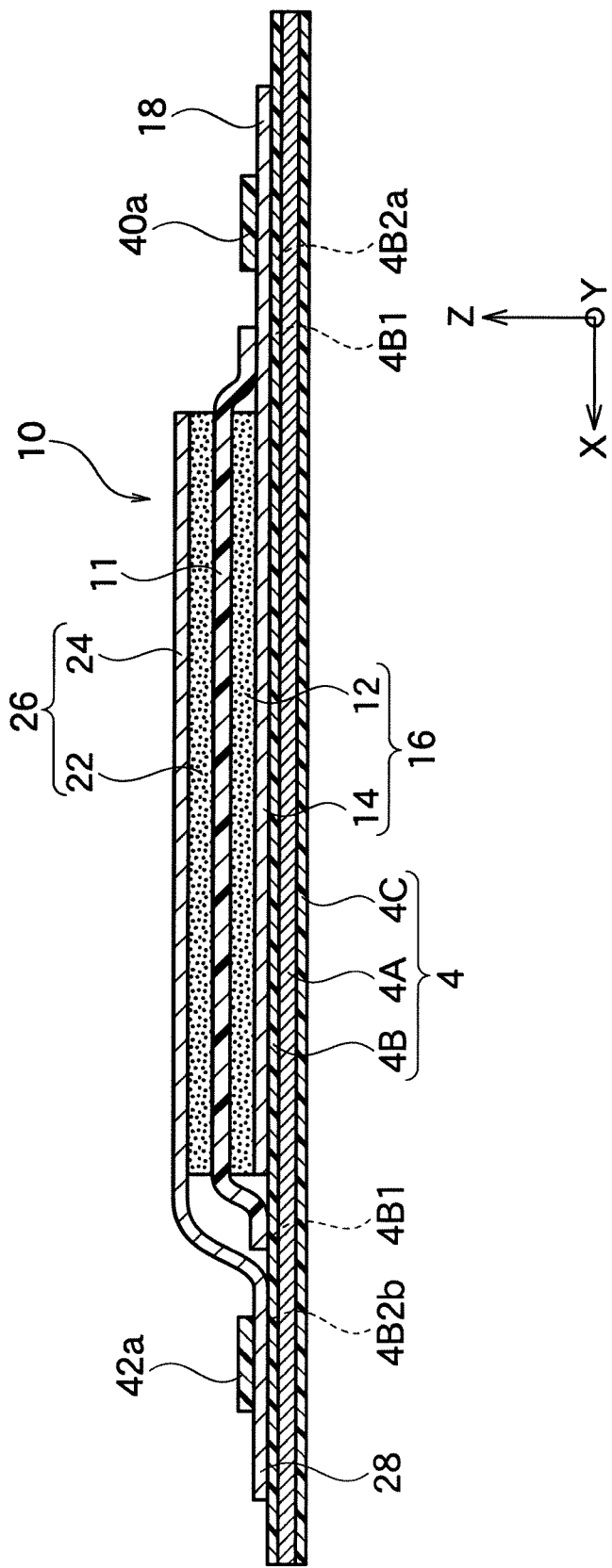
FIG. 4B is a schematic cross section figure along IVB-IVB line of FIG. 4A.

As shown in FIG. 3, FIG. 4A, and FIG. 4B, first the element main body 10 is produced. In order to produce the element main body 10, as shown in FIG. 3, one of electrode 16 is prepared, and a tape 40a is adhered to the boundary part between the electrode 16 and the lead terminal 18. Then, the electrode 16 and the tape 40a are fixed at the predetermined position of the inner layer 4B which is the back face 4b of the exterior sheet 4 so that the active material layer 12 of the electrode 16 is facing towards up in Z axis direction.

Therefore, a tip of a spot heat bonding apparatus (not shown in figure) is applied to an intersection part between the tape 40a and the electrode 16 (the part where the active material layer 12 is not formed), and the tape 40a and the electrode 16 are partially heat bonded to the inner layer 4B made of resin formed on an inner surface of the exterior sheet 4. As a result, at the inner layer 4B made of resin, the electrode bonding part 4B2a is partially formed at the position corresponding to the intersection part between the tape 40a and the electrode 16 (the first collector layer 14 where the active material layer 12 is not formed).

The shape of the electrode bonding part 4B2a which is partially formed is not particularly limited, but for example a circle shape having an outer diameter of 0.2 to 1.0 mm or so, an oval shape having about the same size, or polygonal shape (triangle or more) having about the same size may be mentioned. The electrode bonding part 4B2a fixes the electrode 16 and the tape 40a at the predetermined position against the inner layer 4B made of resin of the exterior sheet 4.

Next, the separator sheet 11 is incorporated so that it covers the electrode 16 and the active material layer 12, and the tip of the spot heat bonding apparatus (not shown in figure) is applied to four corners of the separator sheet 11 (the part which does not overlap with the electrode 16) as shown in FIG. 4A. As a result, the separator sheet 11 is partially heat bonded to the inner layer 4B made of resin of the exterior sheet 4, and the separator bonding part 4B1 is partially formed to the inner layer 4B made of resin at the position corresponding to the corner part of the separator sheet 11. The shape and size of the separator bonding part 4B1 is the same as the electrode bonding part 4B2a. The separator bonding part 4B1 fixes the separator sheet 11 at the predetermined position of the inner layer 4B made of resin of the exterior sheet 4.

Next, other electrode 26 is prepared, and the tape 42a is adhered to the boundary part between the electrode 26 and the lead terminal 28. Then, the electrode 26 and the tape 42a are fixed at the predetermined position of the inner layer 4B of the back face 4b of the exterior sheet 4 so that the electrode 26 and the active material layer 22 are facing down in Z axis direction (the side facing the separator 11). Note that, as shown in FIG. 4B, the active material layer 22 of the electrode 26 is preferably facing towards the active material layer 22 of the electrode 16 by being precisely positioned interposing the separator sheet 11.

Therefore, the tip of the spot heat bonding apparatus (not shown in the figure) is applied to the intersection part between the tape 42a and the electrode 26 (the part where the active material layer 22 is not formed), thereby the tape 42a and the electrode 26 are heat bonded partially to the inner layer 4B made of resin formed on inner surface of the exterior sheet 4 as shown in FIG. 4A. As a result, as shown in FIG. 4B, the electrode bonding part 4B2b is formed partially at the inner layer 4B made of resin at the position corresponding to the intersection part between the tape 42a and the electrode 26 (the part where the active material layer 22 is not formed).

The size and shape of the electrode bonding part 4B2b which is partially formed is the same as the electrode bonding part 4B2a. The electrode bonding part 4B2b fixes the electrode 26 and the tape 42a at the predetermined position against the inner layer 4B made of resin of the exterior sheet 4. As a result, as shown in FIG. 4B, the internal electrodes 16 and 26 are stacked so that the active material layers 12 and 22 are respectively positioned and in contact with the both sides of the separator sheet 11.

At each of lead terminals 18 and 28, the sealing tapes 40a and 42a are respectively adhered only to the one surface of the lead terminals 18 and 28 at the position in X axis direction which will be the first sealing part 40 and the second sealing part 42 as mentioned in above (see FIG. 4B). Note that, in FIG. 4B, the sealing tapes 40a and 42a are adhered only to the one side of the surface of each of lead terminals 18 and 28, but as shown in FIG. 2C, the sealing tapes 40a and 42a may be adhered to the both sides of each of lead terminals 18 and 28.

The width W2 in Y axis direction of the sealing tapes 40a and 42a (see FIG. 4A) is preferably longer by 0.5 to 3 mm or so than Y axis direction width of the lead terminals 18 and 28. The width in Y axis direction of the sealing tapes 40a and 42a corresponds to the width in Y axis direction of the first sealing part 40 and the second sealing part 42 of EDLC2 shown in FIG. 1, and defines Y axis direction width W0 of EDLC2.

If the width W2 in Y axis direction of the sealing tapes 40*a* and 42*a* shown in FIG. 4A is too narrow, the sealing at the first sealing part 40 and the second sealing part 42 shown in FIG. 1A may become insufficient. If it is too wide, the Y axis direction width W0 of EDLC2 may become unnecessarily wide. The width in X axis direction of the sealing tapes 40*a* and 42*a* are preferably 2 to 4 mm which corresponds to the length L1 in X axis direction of the first sealing part 40 and the second sealing part 42 shown in FIG. 2.

Next, as shown in FIG. 5A to FIG. 6, the exterior sheet 4 is folded at the folding outer edge 4*c* so that the entire element main body 10 is covered, thus the element main body 10 is covered by the surface 4*a* and the back face 4*b* of the exterior sheet 4. Note that, the exterior sheet 4 is formed long in Y axis direction. The width in X axis direction at the surface 4*a* of the exterior sheet 4 is regulated so that the outer edge 4*d*1 on the side of the first sealing part 40 of the exterior sheet 4 overlaps with the sealing tape 40*a*, and the outer edge 4*d*2 on the side of the second sealing part 42 of the exterior sheet 4 overlaps with the sealing tape 42*a*.

Next, as shown in FIG. 6, the exterior sheet 4 covering the entire element main body 10 is set to a jig not shown in the figure, then the folding outer edge 4*c* of the exterior sheet 4 is pressurized and heated, thereby the third sealing part 44 is formed. Next, the outer edge 4*d*1 on the side of the first sealing part 40 and the outer edge 4*d*2 on the side of the second sealing part 42 of the exterior sheet 4 are pressurized and heated, thereby the first sealing part 40 and the second sealing part 42 are formed.

Here, as shown in FIG. 2A, part of the inner layer (resin) 4B formed on the lower side of the inner surface of the exterior sheet 4 contacts with the one side of the surface (lower side face) of the lead terminals 18 and 28, thereby forms the heat fusion part 4Ba. Also, the sealing tapes 40*a* and 42*a* adhered to the other side of the surface of the lead terminals 18 and 28 are adhered and integrated with the inner layer 4B of the exterior sheet 4 as the adhesive resin which fluidize by pressure and heat, thereby forms the first sealing part 40 and the second sealing part 42 after solidifying. Also, at the same time, the sealing tapes 40*a* and 42*a* as the adhesive resin which fluidize by pressure and heat protrude from the outer edge of the exterior sheet 4 which is positioned on the upper side, and protruded portions 40*b* and 42*b* which are portion of the sealing tapes 40*a* and 42*a* will cover the periphery of the outer edge of the exterior sheet 4.

Next, as shown in FIG. 6, the electrolyte is injected from an opening end 52 of the exterior sheet 4 which is not formed with the fourth sealing part 46, then the last fourth sealing part 46 is formed by heat sealing similarly as mentioned in the above. Then, the exterior sheet 4 is cut along the cutting line 54 at the outside of the fourth sealing part 46 to remove an excessive portion of exterior sheet 4; thereby EDLC2 of the present embodiment is obtained.

In the present embodiment, the sealing tape 40*a* adhered to the one side of the surface of the first lead terminal 18 is heat sealed (heat compressed) at the outer edge 4*d*1 on the side of the first sealing part 40 of the exterior sheet 4 of the upper side, thereby the first sealing part 40 is formed. Note that, the first sealing part 40 includes the heat fusion part 4Ba which is formed at part of the inner layer 4B made of resin formed on the inner surface of the exterior sheet 4 of the lower side. Also, similarly, the sealing tape 42*a* adhered to the one side of the surface of the second lead terminal 28 is heat sealed (heat compressed) at the outer edge 4*d*2 on the side of the second sealing part 42 of the exterior sheet 4 of the upper side, thereby the second sealing part 42 is formed. Note that, the second sealing part 42 includes the heat fusion part 4Ba which is formed at part of the inner layer 4B made of resin formed on the inner surface of the exterior sheet 4 of the lower side.

In the present embodiment, the insulation tapes 40*a* and 42*a* which constitute the sealing part are adhered only to the one side of the surface (upper side surface) of the lead terminals 18 and 28 to function as adhesive resin, and the other face (lower side surface) is formed with the heat fusion part 4Ba by directly contacting to the inner layer 4B made of resin formed on the inner surface of the exterior sheet 4. Thereby, the sealing of the inside of the device can be secured in good condition and also the short circuit can be effectively avoided. As a result, the thickness of the sealing parts 40 and 42 which are the thickest part can be thinned as much as possible while securing the sealing property and avoiding the short circuit.

That is, EDLC2 according to the present embodiment can attain the electrochemical device which has been thinned to the level allowing to be incorporated into the thin electronic devices such as IC card or so while securing the sealing of the inside of the device and avoiding the short circuit.

Also, in the present embodiment, part of the adhesive resin constituting the sealing parts 40 and 42 protrudes to the outside from the outer edge of the exterior sheet 4 of the upper side, and covers the periphery of the outer edge of the exterior sheet 4. Therefore, at the periphery of the outer edge of the exterior sheet 4, and end of the metal sheet 4A constituting the exterior sheet 4 will not expose, and the short circuit between the lead terminals 18 and 28 with the metal sheet 4A can be effectively prevented.

Further, the device 2 of the present embodiment has the support sheets 4*f*1 and 4*f*2 for preventing the bending of the lead terminals 18 and 28 extending from the sealing parts 40 and 42, thus the lead terminals 18 and 28 extending from the sealing parts 40 and 42 can be effectively prevented. Also, the support sheets 4*f*1 and 4*f*2 are constituted by extending part of the outer edge of the exterior sheet 4 of the lower side positioned at the sealing parts 40 and 42 to the outside, thus the support sheets 4*f*1 and 4*f*2 can be easily formed.

Also, the length of the protrusion of the support sheets 4*f*1 and 412 are longer than the length of the protrusion of the lead terminals 18 and 28, thus the lead terminals 18 and 28 extending from the sealing parts 40 and 42 can be effectively prevented from bending.

Particularly, in the present embodiment, the separator bonding part 4B1 for partially bonding a part of the separator sheet 11 to the inner surface of the exterior sheet 4 is formed to the inner layer 4A made of resin present on the inner surface of the exterior sheet 4. Thus, at least the separator sheet 11 is positioned on the inner side of the exterior sheet 4, and the positions against the internal electrodes 16 and 26 can be determined easily, thus the positioning tape which remained inside of the electrochemical device 2 with element 10 conventionally will be unnecessary.

That is, the electrochemical device 2 according to the present embodiment enables further thinning of the device 2 while preventing the position shifting between the separator sheet 11 and the pair of the internal electrodes 16 and 26 on the inner side of the exterior sheet 4.

Further, the separator bonding part 4B1 is partially adhered to the corner parts of the separator sheet 11 in a manner not overlapping with the internal electrodes 16 and 26 when looking from Z axis direction, thus the effective area of the active material layers 12 and 24 formed on the internal electrodes 16 and 26 can sufficiently exhibit its function.

Furthermore, the electrode bonding parts 4B2a and 4B2b which partially adheres part of the internal electrodes 16 and 26 not overlapping with the separator sheet 11 when looking at the inner side of the exterior sheet 4 from Z axis direction is formed to the inner layer 4B separately from the separator bonding part 4B1. By constituting as such, the internal electrode 16 and 26 are fixed to the inner surface of the exterior sheet 4 and positioned. Therefore, the position of the pair of the internal electrodes 16 and 26 with respect to the separator sheet 11 can be easily determined, and the positioning tape will be unnecessary which contributes for attaining a thin device 2.

Also, the electrode bonding parts 4B2a and 4B2b are formed to the part which does not overlap with the separator sheet 11 when looking from Z axis direction, thus the active material layers 12 and 22 which are formed to the internal electrodes 16 and 26 at the position overlapping with the separator sheet 11 can sufficiently exhibit its function.

Further, the exterior sheet 4 has the surface 4a covering the surface of the element main body 10, and the back face 4b covering the back face of the element main body 10, and both of the pair of the internal electrodes 16 and 26 are partially adhered to the inner layer 4B of the back face 4b of the exterior sheet 4 via the electrode bonding parts 4B2a and 4B2b. Therefore, the separator sheet 11 and the pair of the internal electrodes 16 and 26 can be positioned with respect to the back face 4b of the exterior sheet 4, thus the internal electrodes 16 and 26 does not have the position shifting against each other, and hence the performance of the device improves. Also, the positioning tape will be unnecessary, hence contributes to the thinning of the device. For example, the maximum thickness of EDLC2 can be 1 mm or less, preferably 0.9 mm or less, and more preferably 0.5 mm or less.

Second Embodiment

Figure 1B:
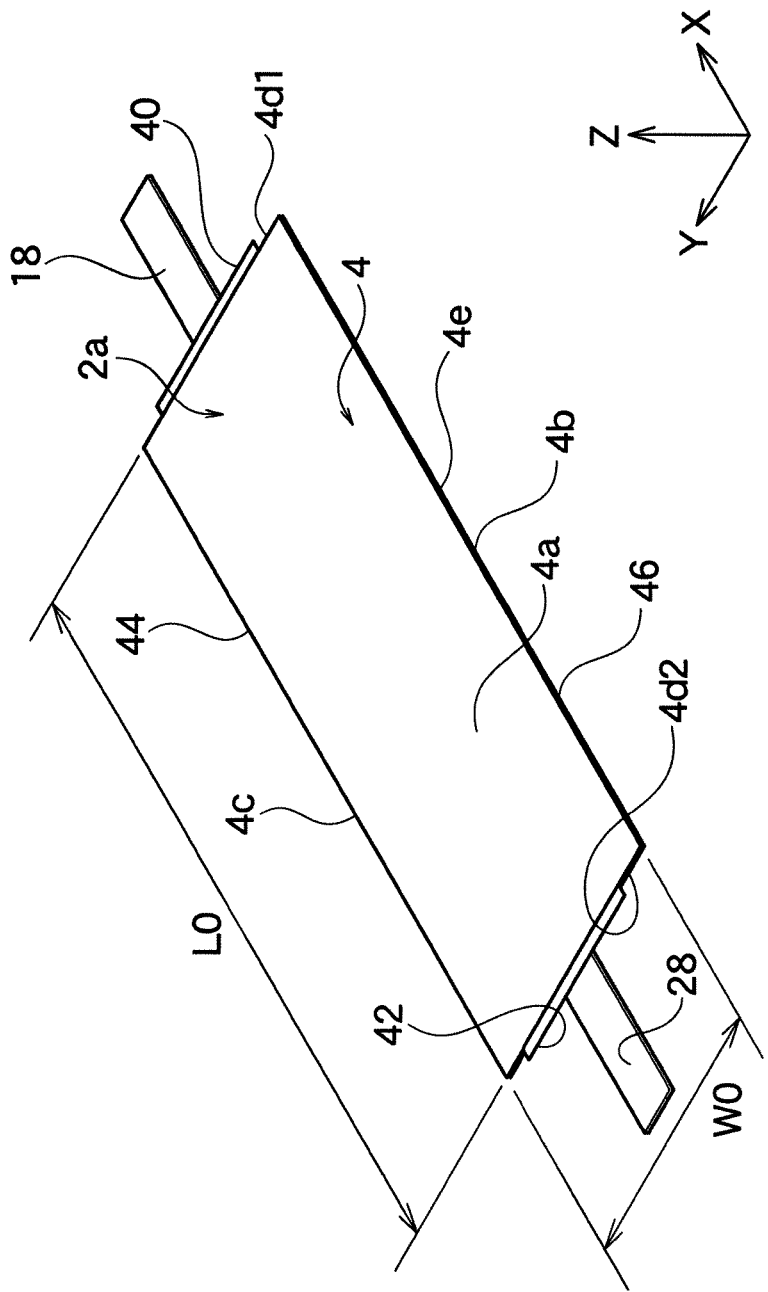
FIG. 1B is a perspective figure of an electric double layer capacitor according to another embodiment of the present invention.

As shown in FIG. 1B, EDLC2a of the present embodiment is same as EDLC2 of the first embodiment except for not having the support sheets 4f1 and 4f2 shown in FIG. 1A, thus the same numbers are given to the same members in the figures, and the description of the same parts will be omitted.

Third Embodiment

Figure 2B:
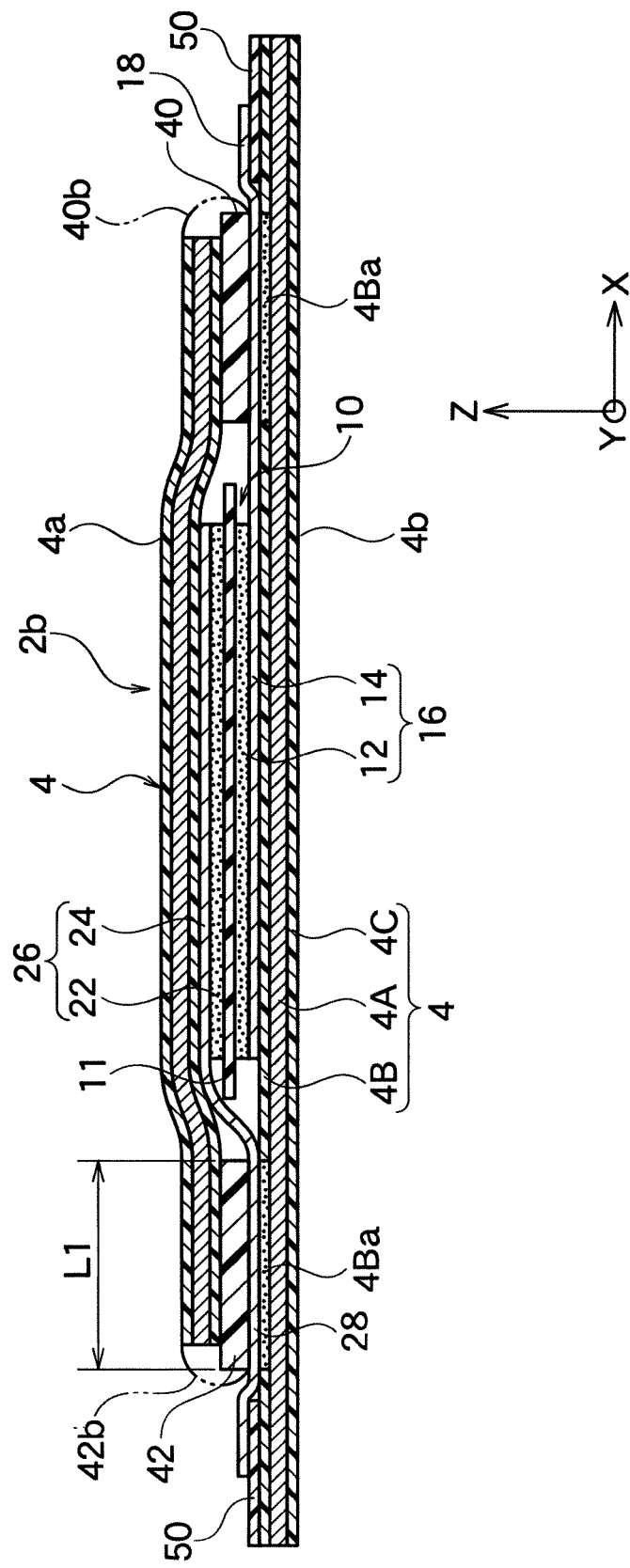
FIG. 2B is a schematic cross section figure of the electric double layer capacitor according to other embodiment of the present invention.
Figure 2C:
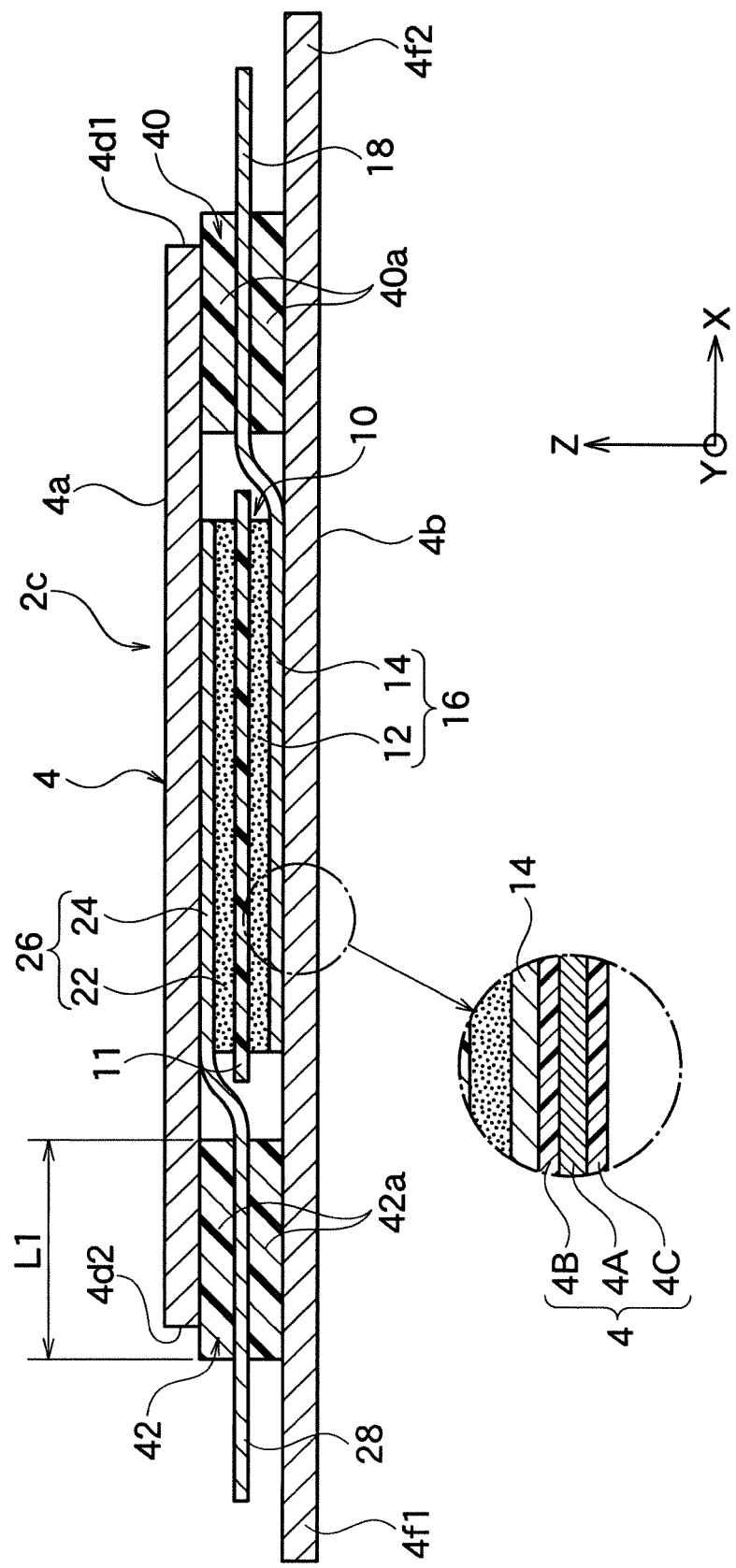
FIG. 2C is a schematic cross section figure of the electric double layer capacitor according to further other embodiment of the present invention.

As shown in FIG. 2B, for EDLC2b of the present embodiment, the heat resistant insulation layer 50 is stacked at the face of the support sheets 4f1 and 4f2 which contact with the lead terminals 18 and 28 protruding out from the sealing parts 40 and 42. By constituting as such, even if heat is applied when electrically connecting the lead terminals 18 and 28 with an external connective terminal (not shown in the figure), the short circuit between the metal sheet 4A and the lead terminals 18 and 28 present on the inner side of the exterior sheet 4 can be effectively prevented.

As the resin constituting the heat resistance insulation layer 50, for example polyethyleneterephthalate (PET) is preferably used, but nylon, PET, PC, PES, PEN, PI, and fluorine resin or so may be used as well.

The effect and the other constitution of the present embodiment is same as the first and the second embodiment, thus the same numbers are given to the same members in the figures, and the description of the same parts will be omitted.

Fourth Embodiment

As shown in FIG. 2C, in EDLC2c of the present embodiment, the sealing parts 40 and 42 formed at the outer edges 4d1 and 4d2 of the exterior sheet 4 where the lead terminals 18 and 28 extend to the outside in X axis direction are respectively formed by a pair of sealing tapes 40a and 40b. That is, the pair of the sealing tapes 40a and 40b are respectively provided so as to cover the surface and the back face interposing the lead terminals 18 and 28, and these are heat compressed and form the sealing parts 40 and 42.

In case of the present embodiment, the thickness of the sealing parts 40 and 42 are thicker than that described in aforementioned embodiments, but compared to the conventional thickness, it is sufficiently thin. The effect and the other constitution of the present embodiment is same as the first to third embodiments, thus the same numbers are given to the same members in the figures, and the description of the same parts will be omitted.

Fifth Embodiment

In the present embodiment, instead of the step shown in FIG. 5A, the step shown in FIG. 5B is used, other than that other constitution and effect of the present embodiment are same as the first to fourth embodiments, thus the same numbers are given to the same members in the figures, and the description of the same parts will be omitted.

In the present embodiment, as shown in FIG. 5B, it is the same as the first embodiment up until partially forming the electrode bonding part 4B2a and the separator bonding part 4B 1 to the inner layer 4B which will be the back face 4b of the exterior sheet 4. Then, before or after, or at the same time, the electrode bonding part 4B2b is formed partially to the inner layer 4B which will be the surface 4a of the exterior sheet 4, and the other electrodes 26 and the tape 42a are positioned and fixed. Here, the active material layer 22 of other electrode 26 faces up in Z axis direction so that the collector layer 24 of other electrode 26 contacts with the inner layer 4B of the exterior sheet 4.

Then, as shown in FIG. 6, the exterior sheet 4 is folded at the folding outer edge 4c so as to cover the entire element main body 10, thereby the element main body 10 is covered with the surface 4a and the back face 4b of the exterior sheet 4. The subsequent steps are the same as the first embodiment mentioned in the above.

In the present embodiment, the position of the separator sheet 11 and the pair of the internal electrodes 16 and 26 can be determined against the surface 4a and the back face 4b of the exterior sheet 4, thus the position shifting of the internal electrodes 16 and 26 does not occur, hence the performance of the device improves. Also, the positioning tape becomes unnecessary, and contributes to the thinning of the device. Further, in the present embodiment, compared to the embodiment shown in FIG. 5A, the internal electrode 26 is more flat and fixed against the inner layer 4B of the surface 4a of the exterior sheet 4, thus the internal stress acting on the internal electrode 26 can be reduced.

Sixth Embodiment

Figure 7:
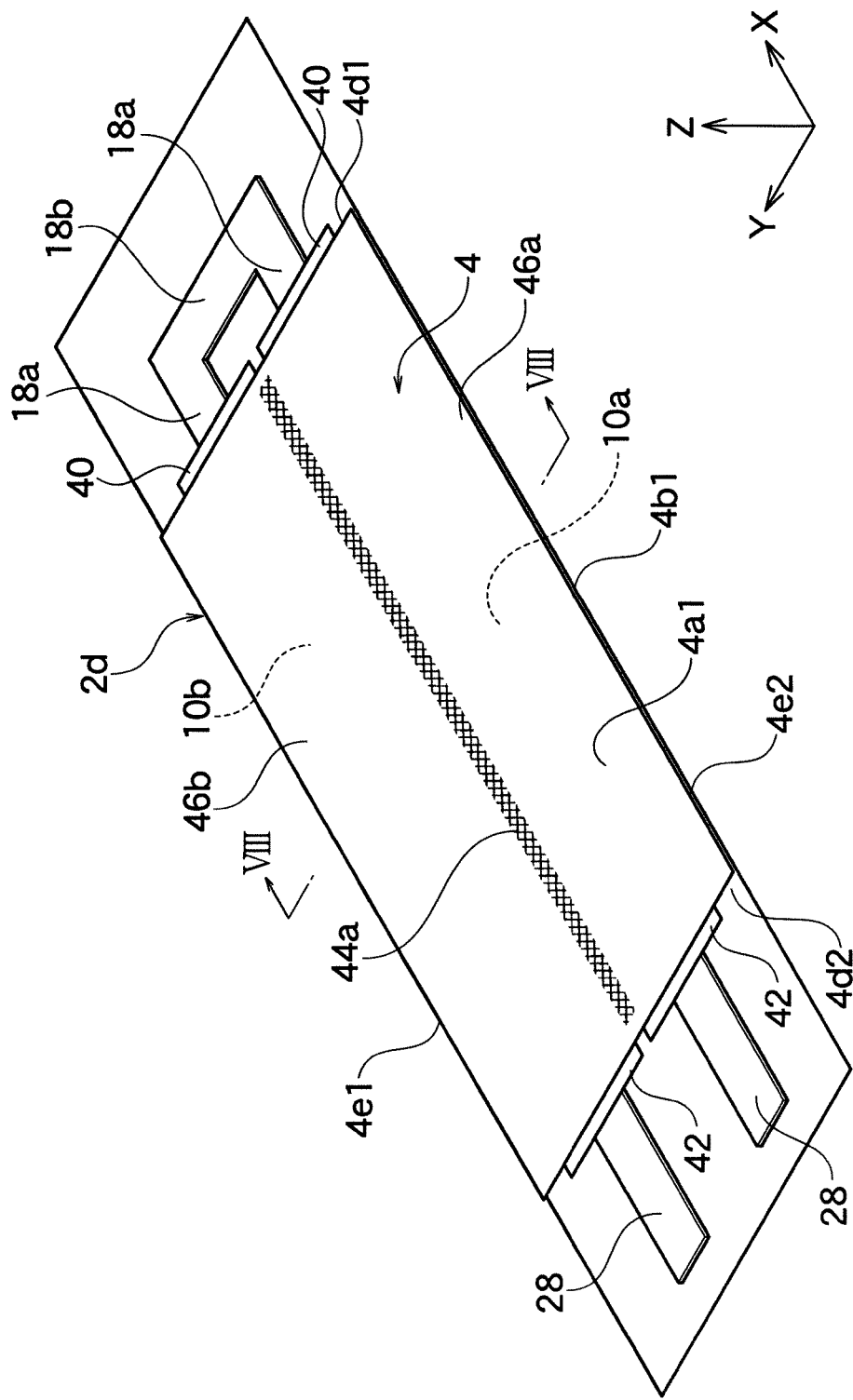
FIG. 7 is a perspective figure of the electric double layer capacitor according to other embodiment of the present invention.

As shown in FIG. 7, in EDLC2 of the present embodiment, two element main bodies 10a and 10b aligning in Y axis direction are incorporated on the inner side of the exterior sheet 4. Other than that, it is same as the first embodiment, thus the same numbers are given to the same members in the figures, and the description of the same parts will be partially omitted; and the parts which differ will be described.

Figure 8:
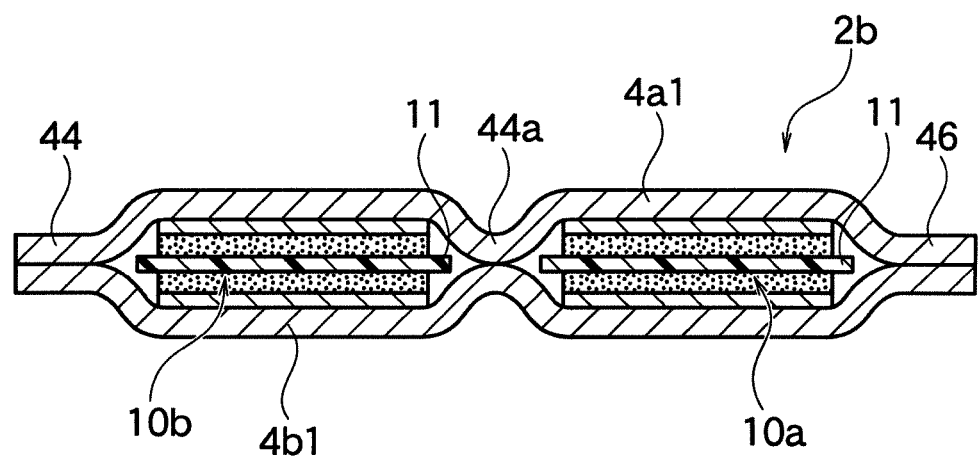
FIG. 8 is a cross section figure of an essential part along VIII-VIII line of FIG. 7.
Figure 8:
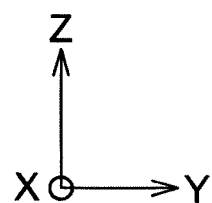

In the present embodiment, as shown in FIG. 7, the exterior sheet 4 is made of the surface sheet 4a1 and the back face sheet 4b1, and compared to the exterior sheet 4, the size is about twice as large in Y axis direction. On the inner side of the exterior sheet 4, as shown in FIG. 8, two element main bodies 10a and 10b are incorporated, and each of the element main bodies 10a and 10b have the same structure as the element main body 10 of the first embodiment.

In the present embodiment, the second lead terminals 28 and 28 of the element main bodies 10a and 10b are formed separately, but the first lead terminals 18a of the element main bodies 10a and 10b are integrally formed with the connection part 18b and are continuous. That is, as shown in FIG. 9, the element main bodies 10a and 10b are connected in series via the first lead terminals 18a and the connection part 18b formed integrally and continuously with each of the first collector layers 14 of the element main bodies 10a and 10b.

At the center part in the axis direction of the exterior sheet 4, the third sealing part 44a is formed along X axis direction, thereby the flow of the electrolyte is blocked between the element main bodies 10a and 10b. The space where the element main body 10a is housed is sealed by the first sealing part 40, the second sealing part 42, the third sealing part 44a, and the fourth sealing part 46a which are formed continuously with the exterior sheet 4; thereby the electrolyte is retained. Similarly, the space where the element main body 10b is housed is sealed by the first sealing part 40, the second sealing part 42, the third sealing part 44a, and the fourth sealing part 46b which are formed continuously with the exterior sheet 4; thereby the electrolyte is retained.

Next, the method of producing EDLC2d of the present embodiment will be described using FIG. 9 to FIG. 10.

Figure 9:
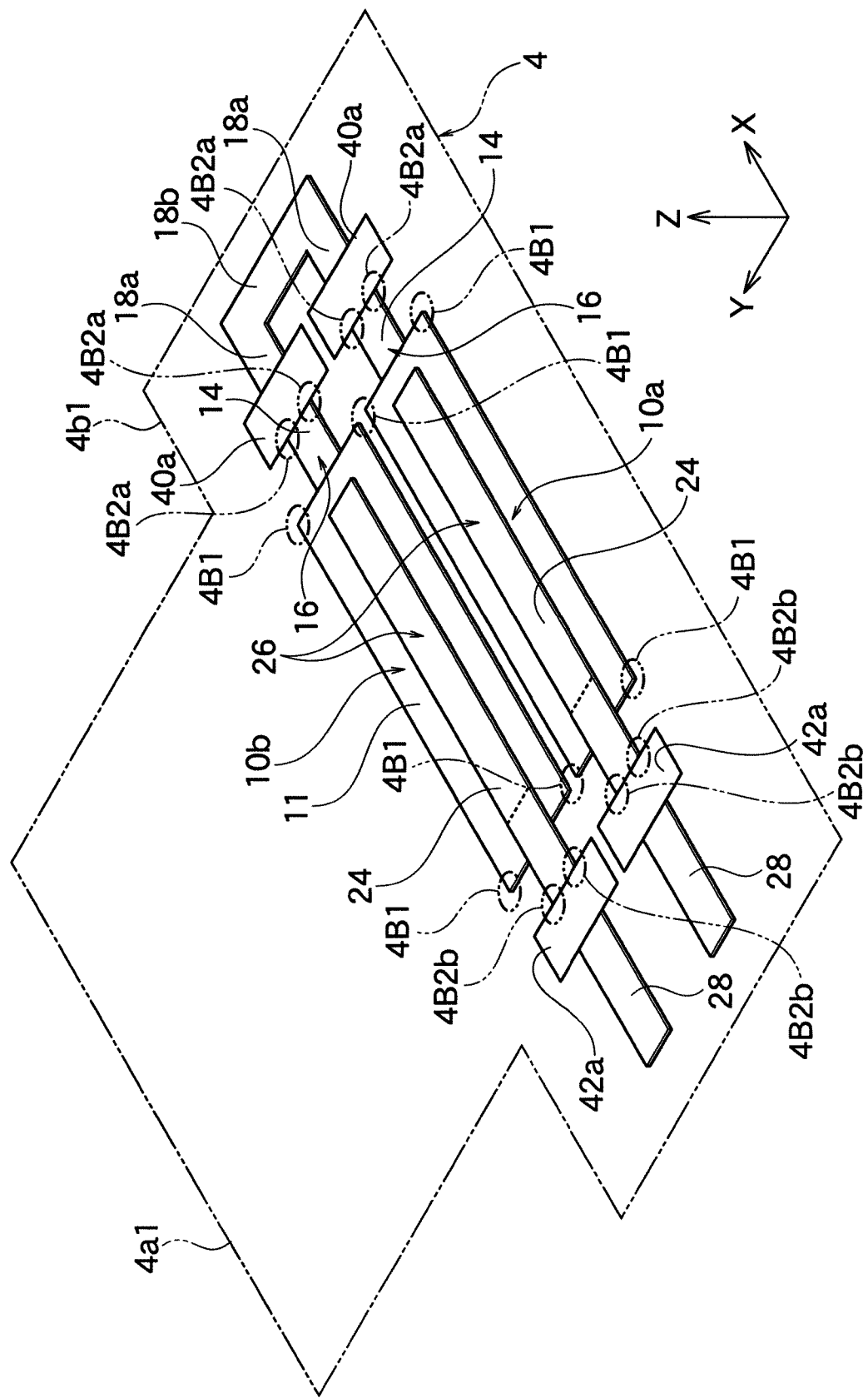
FIG. 9 is a schematic perspective figure showing the method of production of the electric double layer shown in FIG. 7.

As shown in FIG. 9, first, two element main bodies 10a and 10b are formed by aligning in Y axis direction on a pair of the separator sheets 11. Note that, two element main bodies 10a and 10b may be formed on single separator sheet 11. The production method of the element main bodies 10a and 10b are same as the first embodiment.

At the lead terminals 18a and 28 of the element main bodies 10a and 10b, as mentioned in the above embodiments, the sealing tapes 40a and 42a are adhered to the one side of the surface of the lead terminals 18a and 28. Also, as the method of forming the electrode bonding parts 4B2a and 4B2b and the separator bonding part 4B1, it is the same as mentioned in the above embodiments. In the present embodiment, the corner part of two separator sheets 11 adjacent to each other can be fixed by single separator bonding part 4B1.

Next, the surface sheet 4a1 and the back face sheet 4b1 constituting the exterior sheet 4 are folded against each other so as to cover the entire element main bodies 10a and 10b. Note that, the exterior sheet 4 is formed long in Y axis direction. The width in X axis direction of the exterior sheet 4 is regulated so that the outer edge 4d1 on the side of the first sealing part 40 of the exterior sheet 4 overlaps with the tape 40a, and the outer edge 4d2 on the side of the second sealing 40 of the exterior sheet 4 overlaps with the tape 42a.

Figure 10:
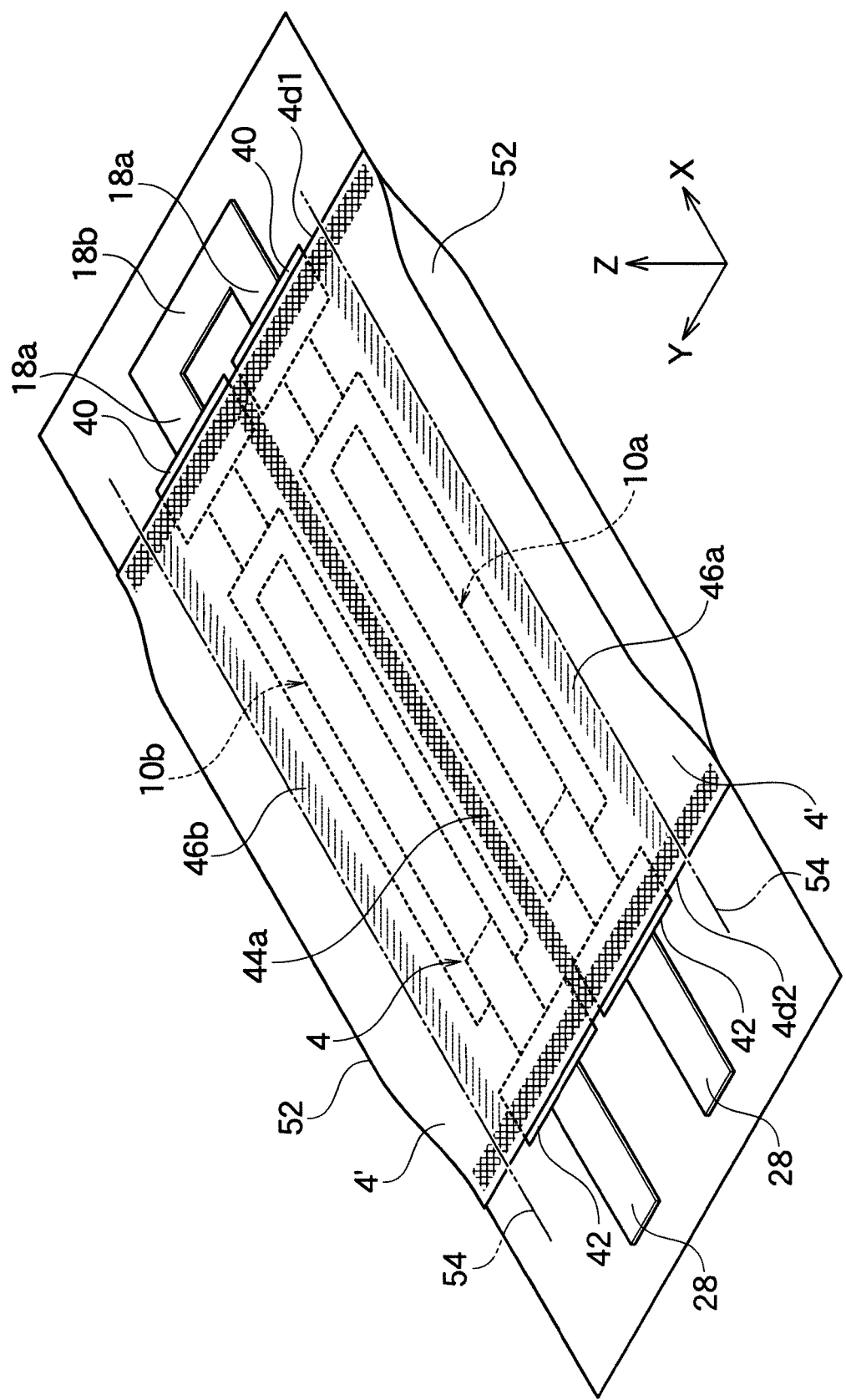
FIG. 10 is a perspective figure showing a step following FIG. 9.

Next, as shown in FIG. 10, the exterior sheet 4 covering the entire element main body 10 is set to the jig not shown in the figure, and the center part in Y axis direction of the exterior sheet 4 is heat pressed along X axis direction, thereby the third sealing part 44a is formed. Next, the outer edge 4d1 on the side of the first sealing part 40 and the outer edge 4d2 on the side of the second sealing part 40 of the exterior sheet are heat pressed, thereby the first sealing part 40 and the second sealing part 42 are formed.

Next, the electrolyte is injected from the opening end 52 of the exterior sheet 4 where the fourth sealing parts 46a and 46b are not formed, then the last fourth sealing parts 46a and 46b are formed by heat sealing similarly as mentioned in above. Then, the exterior sheet 4 is cut along the cutting line 54 at the outside of the fourth sealing parts 46a and 46b to remove an excessive portion of the exterior sheet 4', thereby EDLC2d of the present embodiment shown in FIG. 7 is obtained.

Note that, in the embodiment mentioned in above, the lead terminals 18a extending in X axis direction of the exterior sheet 4 is integrally connected by the connection part 18b in advance, but the lead terminals 18a which does not have the connection part 18b may extend from the first sealing part 40.

In the present embodiment, the lead terminals extending out to the same side in X axis direction are connected in series or in parallel, thereby the capacity of the battery can be increased, and the voltage resistance can be enhanced. Also, in the present embodiment, the support sheets 4f1 and 4f2 shown in FIG. 1 are used, thus the connection part 18b, the lead terminals 28 and 18a can be effectively prevented from bending. The effect and other constitution of the present embodiment are same as the embodiments shown in the above.

Note that, the present invention is not to be limited to the embodiments mentioned in above, and can be modified variously within the scope of the present invention.

For example as the electrochemical device of a laminate type which the present invention can be used, not only EDLC but also a lithium battery, and a lithium battery capacitor or so may be mentioned as well.

NUMERICAL REFERENCES

2, 2a, 2b, 2c, 2d . . . Electric double layer capacitor (EDLC)
4 . . . Exterior sheet
4a . . . Front face
4a1 . . . Front face sheet
4b . . . Back face
4b1 . . . Back face sheet
4c . . . Folding outer edge
4d1 . . . Outer edge of first sealing part side
4d2 . . . Outer edge of second sealing part side
4e . . . Outer edge
4f1, 4f2 . . . Support sheet
4A . . . Metal sheet
4B . . . Inner layer
4Ba . . . Heat fusion part
4B 1 . . . Separator bonding part
4B2a, 4B2b . . . Electrode bonding part
4C . . . Outer layer
10 . . . Element main body
11 . . . Separator sheet
12 . . . First active material layer
14 . . . First collector layer
16 . . . First internal electrode
18 . . . First lead terminal
22 . . . Second active material layer
24 . . . Second collector layer
26 . . . Second internal electrode
28, 28a . . . Second lead terminal
40 . . . First sealing part
42 . . . Second sealing part 44 . . . Third sealing part
46 . . . Fourth sealing part
50 . . . Heat resistance insulation layer

The invention claimed is:

1. An electrochemical device comprising
an element main body formed by stacking a pair of internal electrodes and a separator sheet placed between the pair of internal electrodes,
an exterior sheet covering the element main body,
a sealing part to seal an outer edge of the exterior sheet for immersing the element main body in an electrolyte, and
a lead terminal electrically connected to either of the internal electrodes and extending to an outer side from the sealing part of the exterior sheet, wherein
a separator bonding part for fixing at least part of the separator sheet to an inner surface of the exterior sheet is formed on an inner layer made of a resin present on the inner surface of the exterior sheet,
the separator bonding part has a spot shape and is fixed to a part of the separator sheet not overlapping with the internal electrodes as viewed from a direction perpendicular to a surface of the separator sheet,
an electrode bonding part for fixing a part of the internal electrodes not overlapping with the separator sheet to the inner surface of the exterior sheet is formed on the inner layer separately from the separator bonding part as viewed from the direction perpendicular to the surface of the separator sheet,
the electrode bonding part has a spot shape and is formed at a position corresponding to an intersection part between the internal electrode where an active material layer is not formed and a sealing tape forming a part of the sealing part as viewed from the direction perpendicular to the surface of the separator sheet,
the spot shapes of the separator bonding part and the electrode bonding part each have a circle, oval, or polygonal shape,
the electrode bonding part fixes the internal electrode and the sealing tape at a predetermined position against the inner layer of the exterior sheet, and
the separator bonding part fixes the separator sheet at a predetermined position of the inner layer of the exterior sheet.

2. The electrochemical device according to claim 1, wherein
the exterior sheet comprises a front face part covering a front face of the element main body, and a back face part covering a back face of the element main body, and
the pair of the internal electrodes are fixed to either one of the front face part or the back face part on the electrode bonding part.

3. The electrochemical device according to claim 1, wherein
the exterior sheet comprises a front face part covering a front face of the element main body, and a back face part covering a back face of the element main body,
either one of the pair of the internal electrodes is fixed to either one of the front face part or the back face part on the electrode bonding part, and
the other one of the pair of the internal electrodes is fixed to the other one of the front face part or the back face part on the electrode bonding part.

4. A method of producing the electrochemical device according to claim 1 comprising steps of,
partially bonding either one of the internal electrodes to the inner surface of the exterior sheet,
partially bonding the separator sheet to the inner surface of the exterior sheet so that an active material layer of the internal electrodes is covered with the separator sheet,
partially bonding the other one of the internal electrodes to the inner surface of the exterior sheet so that the other one of the internal electrodes is placed on the separator sheet,
covering the element main body with the exterior sheet, and
sealing the outer edge of the exterior sheet for immersing the element main body in the electrolyte, wherein
when the internal electrode is partially bonded to the inner surface of the exterior sheet, a tip of a spot heat bonding apparatus is applied to an intersection part between the sealing tape forming a part of the sealing part and the internal electrode where the active material layer is not formed, so that the sealing tape and the internal electrode are partially heat bonded to the inner layer made of resin formed on the inner surface of the exterior sheet.

5. The method of producing the electrochemical device according to claim 4, wherein the sealing part from which the lead terminal extends is formed by heat pressing the sealing tape placed between the exterior sheet.

* * * * *